US009756670B2

(12) United States Patent
Huang et al.

(10) Patent No.: US 9,756,670 B2
(45) Date of Patent: Sep. 5, 2017

(54) METHOD AND SYSTEM FOR NOTIFYING TRANSPORT LAYER ADDRESS

(71) Applicant: ZTE CORPORATION, Shenzhen, Guangdong Province (CN)

(72) Inventors: Ying Huang, Shenzhen (CN); Yunlu Wu, Shenzhen (CN); Yin Gao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 14/784,955

(22) PCT Filed: Dec. 30, 2013

(86) PCT No.: PCT/CN2013/090868
§ 371 (c)(1),
(2) Date: Oct. 16, 2015

(87) PCT Pub. No.: WO2014/169687
PCT Pub. Date: Oct. 23, 2014

(65) Prior Publication Data
US 2016/0105920 A1    Apr. 14, 2016

(30) Foreign Application Priority Data

Apr. 16, 2013  (CN) .......................... 2013 1 0131439

(51) Int. Cl.
*H04W 76/02*  (2009.01)
*H04W 24/02*  (2009.01)
(Continued)

(52) U.S. Cl.
CPC ......... *H04W 76/022* (2013.01); *H04W 24/02* (2013.01); *H04W 84/045* (2013.01); *H04W 92/20* (2013.01)

(58) Field of Classification Search
None
See application file for complete search history.

(56) References Cited

U.S. PATENT DOCUMENTS

| 2010/0039991 A1* | 2/2010 | Godin | H04W 24/02 370/328 |
| 2010/0046476 A1* | 2/2010 | Qiu | H04W 36/02 370/331 |

(Continued)

FOREIGN PATENT DOCUMENTS

| CN | 102378360 A | 3/2012 |
| CN | 102457915 A | 5/2012 |
| WO | WO 2012/025059 A1 * | 1/2012 |

OTHER PUBLICATIONS

R3-122594; Discussion on the X2 setup between eNB and HeNB; ZTE; 3GPP TSG-RAN3 Meeting #78 New Orleans, Louisiana, Nov. 12-16, 2012.

(Continued)

*Primary Examiner* — Jenee Williams
(74) *Attorney, Agent, or Firm* — Ling Wu; Stephen Yang; Ling and Yang Intellectual Property

(57) ABSTRACT

A method and system for notifying a transport layer address are disclosed. The method includes: a first base station sending transport layer address information of an X2 gateway connected to the first base station to a second base station, wherein, the first base station is a home base station (step 10); and the second base station initiating an X2 connection establishment flow according to the received transport layer address information of the X2 gateway (step 20). The system includes: a first base station, configured to: send transport layer address information of an X2 gateway connected to the first base station to a second base station; wherein, the first base station is a home base station; and the second base station, configured to: initiate an X2 connection establishment flow according to the received transport layer address information of the X2 gateway.

18 Claims, 8 Drawing Sheets

(51) Int. Cl.
   *H04W 92/20* (2009.01)
   *H04W 84/04* (2009.01)

(56) References Cited

U.S. PATENT DOCUMENTS

| | | | |
|---|---|---|---|
| 2010/0208693 A1* | 8/2010 | Centonza | H04W 36/0083 370/331 |
| 2010/0329150 A1* | 12/2010 | Nielsen | H04W 24/02 370/254 |
| 2011/0237258 A1* | 9/2011 | Nylander | H04J 11/0093 455/437 |
| 2011/0274030 A1* | 11/2011 | Wang | H04W 76/02 370/315 |
| 2011/0274086 A1* | 11/2011 | Xu | H04L 63/061 370/331 |
| 2011/0306363 A1* | 12/2011 | Wang | H04W 24/02 455/456.1 |
| 2011/0310791 A1* | 12/2011 | Prakash | H04W 24/02 370/315 |
| 2012/0039299 A1* | 2/2012 | Teyeb | H04B 7/2606 370/331 |
| 2012/0106488 A1* | 5/2012 | Nylander | H04L 29/12066 370/329 |
| 2012/0188984 A1 | 7/2012 | Takahashi et al. | |
| 2013/0089076 A1* | 4/2013 | Olvera-Hernandez | H04W 36/08 370/332 |
| 2013/0100929 A1* | 4/2013 | Liu | H04W 36/00 370/331 |
| 2013/0258967 A1* | 10/2013 | Watfa | H04W 76/00 370/329 |
| 2013/0322390 A1* | 12/2013 | Xu | H04W 76/02 370/329 |
| 2014/0357285 A1* | 12/2014 | Smith | H04W 48/17 455/450 |
| 2015/0003256 A1* | 1/2015 | Ivershen | H04W 24/08 370/241 |
| 2015/0208289 A1* | 7/2015 | Xu | H04W 76/022 370/331 |
| 2015/0215774 A1* | 7/2015 | Huang | H04W 76/022 455/422.1 |
| 2015/0304888 A1* | 10/2015 | Masini | H04W 8/082 370/254 |

OTHER PUBLICATIONS

R3-122674; eNB IP address discovery for X2-GW deployment; New Postcom; 3GPP TSG-RAN WG3 Meeting #78 New Orleans, U.S.A., Nov. 12-16, 2012.
R3-130179; Alignment with the X2 GW work item scope; Alcatel-Lucent; 3GPP TSG-RAN3 Meeting #79, Malta, Jan. 28-Feb. 1, 2013.
R3-130194; X2 Setup procedure between eNB and HeNB; ZTE; 3GPP TSG-RAN3 Meeting #79, Malta, Malta, Jan. 28-Feb. 1, 2013.
R3-130571; Issues on X2-GW deployment; zte; 3GPP TSG-RAN3 Meeting #79bis, Chicago, USA, Apr. 15-19, 2013.

* cited by examiner

METHOD AND SYSTEM FOR NOTIFYING TRANSPORT LAYER ADDRESS

TECHNICAL FIELD

The present document relates to the field of wireless communication technology, and particularly, to a method and system for notifying a transport layer address.

BACKGROUND OF THE RELATED ART

A home base station is a small-size low-power base station, which is mainly used in small-scale indoor places such as homes and offices and so on. The home base station connects to a core network of the mobile operator in wired access ways such as indoor cable, Digital Subscriber Loop (DSL) or optical fiber and so on, which provides access services based on a wireless mobile communication network for specific users. It is an effective supplement to the existing network deployment, which can effectively improve the indoor voice and high-speed data service coverage. The home base station has many advantages, such as low costs, low power, simple access, plug and play, saving backhaul, being easily compatible with the existing terminals, and being able to improve the network coverage rate and so on.

The home base station in a Long Term Evolution (LTE) system defined by the Third Generation Partnership Projects (3GPP) standards organization is called as a home eNB (HeNB). Functions supported by the HeNB are basically identical with functions of an eNB, and processes between the HeNB and an Evolved Packet Core network (EPC) are basically identical with processes between the eNB and the EPC. Since the HeNB is normally deployed without network planning of the mobile operator, a coverage area is small and the number of HeNBs is large, therefore, in order to more conveniently manage and support a larger number of HeNBs, in an Evolved Universal Terrestrial Radio Access Network (E-UTRAN) architecture, a new network element—Home eNB Gateway (HeNB GW) may also be introduced in an S1 connection between the HeNB and the EPC, and the HeNB can connect to a Mobility Management Entity (MME) through the HeNB GW as an S1 agent.

In the LTE R10 version, a direct X2 interface (i.e., an X2 interface which is not established by other nodes (such as an agent node)) just exists between HeNBs, and it can be used for load balancing, handover optimization and information interaction and so on, but the X2 interface is not supported between a macro base station (eNB) and a home base station (HeNB). In the LTE R11, a new function entity—X2 gateway (called as X2 GW for short) is introduced. The X2 GW is similar to the HeNB GW and is deployed optionally, an indirect X2 interface can be established through the X2 GW or a direct X2 interfaces is not established through the X2 GW between the eNB and HeNB and between the HeNB and HeNB.

FIG. 1 is a schematic diagram of network architecture of the home base station in a case that the X2 gateway is deployed. The HeNB can connect to the MME through the HeNB GW as an S1 agent. In the LTE R11 version, the HeNB also can connect to a neighboring base station (such as a home base station or a macro base station) through the X2 GW; wherein, both the HeNB GW and X2 GW are deployed optionally. As shown in FIG. 1, an eNB1 establishes indirect X2 interfaces with an HeNB2 and HeNB3 through the X2 gateway, and an indirect X2 interface is established between the HeNB2 and HeNB3 through the X2 gateway. The eNB1 also can establish a direct X2 interface with an HeNB1.

An HeNB can obtain an address of an X2 GW to which the HeNB belongs and an address of an HeNB GW to which the HeNB belongs through an HeNB Management System (HeMS) after power-on, and respectively establishes an X2 connection with the X2 GW and establishes an S1 connection with the HeNB GW. In a case that the X2 GW is deployed, if an indirect connection mode based on the X2 GW is used, the HeNB can establish an X2 connection with an opposite-end base station through the X2 GW.

An eNB can discover a cell under a neighboring base station through an Automatic Neighbor Relation (ANR) function, and establish an X2 connection with the neighboring base station. Specifically, after measuring a stronger signal of a neighboring cell, a UE in an eNB cell sends a measurement report to the HeNB, wherein a Physical Cell Id (PCI), an E-UTRAN Cell Global Identifier (ECGI), a Tracking Area Code (TAC) and a Public Land Mobile Network (PLMN) list and etc. can be carried. If the neighboring cell is a cell under the home base station, a Closed Subscriber Group ID (CSG ID) and a member state of the UE in the neighboring cell also can be carried. After obtaining the ECGI (PLMN ID+cell ID) of the neighboring cell, the eNB judges whether the neighboring cell is a macro cell or a home base station cell through information including the PCI, ECGI or CSG ID and so on; if the neighboring cell is a macro cell, the eNB takes the first 20 bits of a cell ID of the macro cell as its eNB ID; and if the neighboring cell is a home base station cell, it takes all the 28 bits of a cell ID of the home base station cell as its eNB ID. After obtaining an eNB ID of a base station to which the neighboring cell belongs and a Tracking Area Indicator (TAI) (PLMN ID+TAC) of the neighboring cell, the eNB initiates a Transport Network Layer (TNL) address discovery process to obtain a transport layer address of the neighboring cell for establishing an X2 connection.

Since the TNL address discovery process is an S1 interface interaction process, and the X2 GW and HeNB GW are independent network elements and are not jointly set in the same network element, the TNL address discovery process does not go through the X2 GW. If the neighboring cell discovered by the eNB is an HeNB cell, and an indirect X2 connection is required to be established between the eNB and the HeNB through an X2 GW, the eNB needs to obtain a TNL address of the X2 GW to establish the indirect X2 connection with the HeNB through the X2 GW. But in the related art, the eNB cannot obtain an address of the X2 GW connected to the HeNB discovered by the eNB and cannot establish an X2 connection with the HeNB.

Moreover, in consideration of safety aspects, in certain networks, a base station has a "firewall" function, which is used for checking whether an IP address of the source end is authorized to communicate with the base station. In order to implement this function, the base station is required to maintain an Access Control List (ACL), and the list contains legal TNL addresses of opposite-end nodes permitted to communicate with the base station. In the existing LTE standard protocol, an initiating-end base station of the TNL address discovery process can send an address of the initiating-end base station itself to a target-end base station through the flow, which is used for implementing a firewall function of the opposite-end base station. In the subsequent process, only when a TNL address of a source-end network node communicating with the target base station is in an ACL of the target base station, can the target base station communicate with the source-end network node.

SUMMARY

When an eNB establishes an X2 connection with an HeNB through an X2 GW, the eNB should establish an X2 connection with the X2 GW, thus the eNB is required to obtain a TNL address of the X2 GW and store the TNL address in an ACL. The embodiments of the present document provide a method and system for notifying a transport layer address, to overcome a defect that the existing eNB cannot obtain the address of the X2 GW connected to the HeNB discovered by the eNB.

A method for notifying a transport layer address provided in the embodiment of the present document comprises:

a first base station sending transport layer address information of an X2 gateway connected to the first base station to a second base station; wherein, the first base station is a home base station; and the second base station initiating an X2 connection establishment flow according to the received transport layer address information of the X2 gateway.

Preferably, the first base station sending the transport layer address information of the X2 gateway connected to the first base station to the second base station comprises:

the first base station initiating a transport layer address discovery process, and sending a base station configuration transfer message to a Mobility Management Entity (MME), wherein the base station configuration transfer message at least carries the transport layer address information of the X2 gateway connected to the first base station; and the MME sending an MME configuration transfer message to the second base station, wherein the MME configuration transfer message at least carries the transport layer address information of the X2 gateway connected to the first base station.

Preferably, the base station configuration transfer message sent by the first base station to the MME further carries connection establishment indication information; wherein, the connection establishment indication information is used for indicating whether the second base station is required to initiate an X2 connection establishment process;

the MME configuration transfer message sent by the MME to the second base station further carries the connection establishment indication information;

the second base station initiating the X2 connection establishment flow according to the received transport layer address information of the X2 gateway comprises:

in a case that the transport layer address information of the X2 gateway is received in the transport layer address discovery process initiated by the first base station, if judging that the connection establishment indication information carried in the received MME configuration transfer message indicates that it is required to initiate the X2 connection establishment process, the second base station sending an X2 connection establishment request message to the X2 gateway.

Preferably, the first base station sending the transport layer address information of the X2 gateway connected to the first base station to the second base station comprises:

the second base station initiating a transport layer address discovery process, and sending a base station configuration transfer message to an MME;

after receiving the base station configuration transfer message, the MME sending an MME configuration transfer message to the first base station;

the first base station sending a base station configuration transfer message to the MME, wherein the base station configuration transfer message at least carries the transport layer address information of the X2 gateway connected to the first base station; and the MME sending an MME configuration transfer message to the second base station, wherein the MME configuration transfer message at least carries the transport layer address information of the X2 gateway connected to the first base station.

Preferably, if the first base station establishes an S1 connection with the MME through a home base station gateway as an S1 agent, the base station configuration transfer message and the MME configuration transfer message transmitted between the first base station and the MME are both transmitted through the home base station gateway.

Preferably, the method further comprises:

after receiving the transport layer address information of the X2 gateway, if there is a firewall function, the second base station storing the transport layer address information of the X2 gateway in an access control list (ACL) maintained by the current base station; and in a subsequent communication process between the second base station and the X2 gateway, the second base station checking whether a transport layer address of the X2 gateway communicating with the second base station exists in the ACL; if the transport layer address exists, permitting communication between the X2 gateway and the current base station; and if the transport layer address does not exist, rejecting communication between the X2 gateway and the current base station.

Preferably, the second base station initiating the X2 connection establishment flow according to the received transport layer address information of the X2 gateway comprises:

the second base station sending an X2 establishment request message to the X2 gateway, wherein the X2 establishment request message carries: base station identity information of the second base station, information of a serving cell under the second base station, information of a neighboring cell of the serving cell and information of a connected MME pool;

after completing an X2 connection establishment with the second base station, if judging that a condition for sending a base station configuration update message is satisfied, the X2 gateway sending a base station configuration update message to the first base station and sending a base station configuration update message to the second base station respectively; wherein, the base station configuration update message sent to the first base station carries X2 interface application layer configuration information of the second base station, comprising: information of a serving cell under the second base station, information of a neighboring cell of the serving cell and information of a connected MME pool; and the base station configuration update message sent to the second base station carries X2 interface application layer configuration information of the first base station, comprising: information of a serving cell under the first base station, information of a neighboring cell of the serving cell and information of a connected MME pool.

Preferably, the condition for sending the base station configuration update message comprises that: the first base station and the second base station are adjacent base stations or an X2 connection has been established between the first base station and the X2 gateway.

Preferably, the second base station initiating the X2 connection establishment flow according to the received transport layer address information of the X2 gateway specifically comprises:

the second base station sending an X2 establishment request message to the X2 gateway, wherein the X2 establishment request message carries: base station identity information of the first base station, base station identity information of the second base station, information of a serving cell under the second base station, information of a neighboring cell of the serving cell and information of a connected MME pool.

Preferably, the method further comprises:

after receiving the X2 establishment request message sent from the second base station, the X2 gateway sending the X2 establishment request message to the first base station according to the base station identity information of the first base station carried in the X2 establishment request message.

Preferably, the method further comprises:

after receiving the X2 establishment request message sent from the second base station, according to the base station identity information of the first base station and/or the base station identity information of the second base station carried in the X2 establishment request message, the X2 gateway sending a base station configuration update message to the first base station and/or sending a base station configuration update message to the second base station correspondingly; wherein, the base station configuration update message sent to the first base station carries X2 interface application layer configuration information of the second base station, comprising: information of a serving cell under the second base station, information of a neighboring cell of the serving cell and information of a connected MME pool; and the base station configuration update message sent to the second base station carries X2 interface application layer configuration information of the first base station, comprising: information of a serving cell under the first base station, information of a neighboring cell of the serving cell and information of a connected MME pool.

Preferably, the method further comprises:

the first base station storing the received X2 interface application layer configuration information of the second base station; and the second base station storing the received X2 interface application layer configuration information of the first base station.

Correspondingly, the embodiment of the present document further provides a system for notifying a transport layer address, which comprises:

a first base station, configured to send transport layer address information of an X2 gateway connected to the first base station to a second base station; wherein, the first base station is a home base station; and the second base station, configured to initiate an X2 connection establishment flow according to the received transport layer address information of the X2 gateway.

Preferably, the system further comprises: a mobility management entity (MME);

the first base station is configured to send the transport layer address information of the X2 gateway connected to the first base station to the second base station by means of:

initiating a transport layer address discovery process, and sending a base station configuration transfer message to the MME, wherein the base station configuration transfer message at least carries the transport layer address information of the X2 gateway connected to the first base station;

the MME is configured to: send an MME configuration transfer message to the second base station, wherein the MME configuration transfer message at least carries the transport layer address information of the X2 gateway connected to the first base station.

Preferably, the system further comprises: a mobility management entity (MME);

the second base station is further configured to: initiate a transport layer address discovery process, and send a base station configuration transfer message to the MME;

the MME is configured to: after receiving the base station configuration transfer message, send an MME configuration transfer message to the first base station; and after receiving the base station configuration transfer message sent from the first base station, send an MME configuration transfer message to the second base station, wherein the MME configuration transfer message at least carries the transport layer address information of the X2 gateway connected to the first base station;

the first base station is configured to send the transport layer address information of the X2 gateway connected to the first base station to the second base station by means of:

sending a base station configuration transfer message to the MME, wherein the base station configuration transfer message at least carries the transport layer address information of the X2 gateway connected to the first base station.

Preferably, the system further comprises a home base station gateway, wherein:

the home base station gateway is configured to: when the first base station establishes an S1 connection with the MME through the home base station gateway as an S1 agent, transmit the base station configuration transfer message and the MME configuration transfer message transmitted between the first base station and the MME.

Preferably, the second base station is further configured to: after receiving the transport layer address information of the X2 gateway, if there is a firewall function, store the transport layer address information of the X2 gateway in an access control list (ACL) maintained by the current base station; and in a subsequent communication process between the second base station and the X2 gateway, check whether a transport layer address of the X2 gateway communicating with the second base station exists in the ACL; if the transport layer address exists, permit communication between the X2 gateway and the current base station; and if the transport layer address does not exist, reject communication between the X2 gateway and the current base station.

Preferably, the system further comprises: an X2 gateway;

the second base station is configured to initiate the X2 connection establishment flow according to the received transport layer address information of the X2 gateway by means of:

sending an X2 establishment request message to the X2 gateway, wherein the X2 establishment request message carries: base station identity information of the second base station, information of a serving cell under the second base station, information of a neighboring cell of the serving cell and information of a connected MME pool;

the X2 gateway is configured to: after completing an X2 connection establishment with the second base station, if judging that a condition for sending a base station configuration update message is satisfied, send a base station configuration update message to the first base station and send a base station configuration update message to the second base station respectively; wherein, the base station configuration update message sent to the first base station carries X2 interface application layer configuration information of the second base station, comprising: information of a serving cell under the second base station, information of a neighboring cell of the serving cell and information of a connected MME pool; and the base station configuration update message sent to the second base station carries X2 interface application layer configuration information of the first base station, comprising: information of a serving cell under the first base station, information of a neighboring cell of the serving cell and information of a connected MME pool.

Preferably, the condition for sending the base station configuration update message comprises that: the first base station and the second base station are adjacent base stations or an X2 connection has been established between the first base station and the X2 gateway.

Preferably, the system further comprises: an X2 gateway;

the second base station is configured to initiate the X2 connection establishment flow with the X2 gateway according to the received transport layer address information of the X2 gateway by means of:

sending an X2 establishment request message to the X2 gateway, wherein the X2 establishment request message carries: base station identity information of the first base station, base station identity information of the second base station, information of a serving cell under the second base station, information of a neighboring cell of the serving cell and information of a connected MME pool.

Preferably, the X2 gateway is configured to: after receiving the X2 establishment request message sent from the second base station, send the X2 establishment request message to the first base station according to the base station identity information of the first base station carried in the X2 establishment request message.

Preferably, the X2 gateway is configured to: after receiving the X2 establishment request message sent from the second base station, according to the base station identity information of the first base station and/or the base station identity information of the second base station carried in the X2 establishment request message, send a base station configuration update message to the first base station and/or send a base station configuration update message to the second base station correspondingly; wherein, the base station configuration update message sent to the first base station carries X2 interface application layer configuration information of the second base station, comprising: information of a serving cell under the second base station, information of a neighboring cell of the serving cell and information of a connected MME pool; and the base station configuration update message sent to the second base station carries X2 interface application layer configuration information of the first base station, comprising: information of a serving cell under the first base station, information of a neighboring cell of the serving cell and information of a connected MME pool.

Preferably, the first base station is further configured to store the received X2 interface application layer configuration information of the second base station; and the second base station is further configured to store the received X2 interface application layer configuration information of the first base station.

With the embodiments of the present document, in a case that an X2 GW is deployed, a TNL address of the X2 GW can be notified to a target base station, so that an indirect X2 connection establishment process between the target base station and an HeNB under the X2 GW can be executed smoothly, and a firewall function of the base station is executed smoothly when the X2 GW communicates with the target base station.

PREFERRED EMBODIMENTS OF THE INVENTION

The embodiments of the present document will be described in detail in combination with the accompanying drawings below. It should be noted that the embodiments in the present document and the characteristics in the embodiments can be optionally combined with each other in the condition of no conflict.

Figure 1:
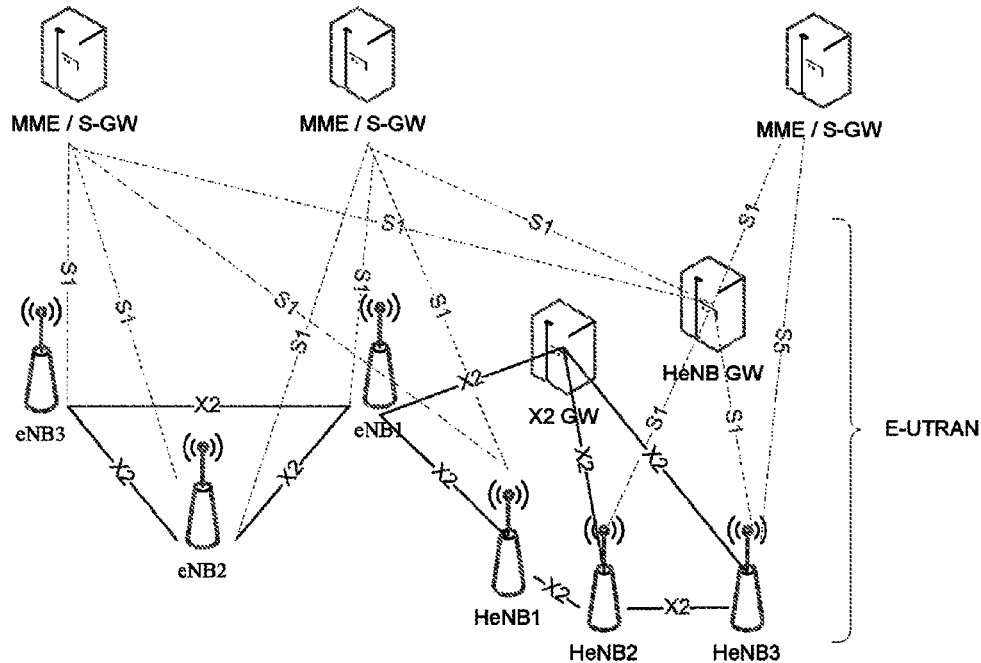
FIG. 1 is a schematic diagram of network architecture of a home base station in a case that an X2 gateway is deployed.
Figure 2:
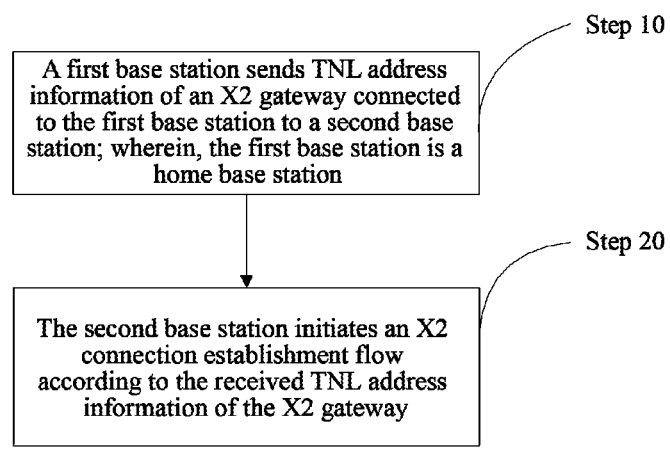
FIG. 2 is a flow chart of a method for notifying a transport layer address in the embodiment of the present document.

In the embodiment, as shown in FIG. 2, a method for notifying a transport layer address includes the following steps.

In step 10, a first base station sends TNL address information of an X2 gateway connected to the first base station to a second base station; wherein, the first base station is a home base station.

In step 20, the second base station initiates an X2 connection establishment flow according to the received TNL address information of the X2 gateway.

In another embodiment, the first base station sending the TNL address information of the X2 gateway connected to the first base station to the second base station includes:

the first base station initiating a TNL address discovery process, and sending a base station configuration transfer message to an MME, wherein the base station configuration transfer message at least carries a TNL address of the X2 gateway connected to the first base station; and the MME sending an MME configuration transfer message to the second base station, wherein the MME configuration transfer message at least carries the TNL address information of the X2 gateway connected to the first base station.

In another embodiment, the first base station sending the TNL address information of the X2 gateway connected to the first base station to the second base station includes:

the second base station initiating a TNL address discovery process, and sending a base station configuration transfer message to an MME; and after receiving the above base station configuration transfer message, the MME sending an MME configuration transfer message to the first base station;

the first base station sending a base station configuration transfer message to the MME, wherein the base station configuration transfer message at least carries the TNL address information of the X2 gateway connected to the first base station; and the MME sending an MME configuration transfer message to the second base station, wherein the MME configuration transfer message at least carries the TNL address information of the X2 gateway connected to the first base station.

In the above two embodiments, if the first base station establishes an S1 connection with the MME through a home base station gateway as an S1 agent, an S1 message (including the base station configuration transfer message and the MME configuration transfer message) transmitted between the first base station and the MME is required to be transmitted through the home base station gateway.

In the above step 20, after receiving the TNL address information of the X2 gateway, if there is a firewall function, the second base station also can store the TNL address of the X2 gateway in an ACL, which is used for subsequent ACL checking. In a subsequent communication process between the second base station and the X2 gateway, the second base station is required to check whether the TNL address of the X2 gateway exists in the ACL; if the TNL address exists, communication between the X2 gateway and the current base station is permitted; and if the TNL address does not exist, communication between the X2 gateway and the current base station is rejected.

In the above step 20, the second base station initiating the X2 connection establishment flow according to the received TNL address information of the X2 gateway includes:

the second base station establishing a Stream Control Transmission Protocol (SCTP) connection with the X2 gateway according to the received TNL address of the X2 gateway; and the second base station sending an X2 establishment request message to the X2 gateway to initiate an X2 connection establishment process. The step includes:

the second base station sending the X2 establishment request message to the X2 gateway, wherein the X2 establishment request message carries: base station identity information of the second base station, information of a serving cell under the second base station, information of a neighboring cell of the serving cell and information of a connected MME pool;

after completing an X2 connection establishment with the second base station, if judging that a condition for sending a base station configuration update message is satisfied, the X2 gateway sending a base station configuration update message to the first base station and sending a base station configuration update message to the second base station respectively; wherein, the base station configuration update message sent to the first base station carries X2 interface application layer configuration information of the second base station, including: information of a serving cell under the second base station, information of a neighboring cell of the serving cell and information of a connected MME pool; and the base station configuration update message sent to the second base station carries X2 interface application layer configuration information of the first base station, including: information of a serving cell under the first base station, information of a neighboring cell of the serving cell and information of a connected MME pool. Moreover, the condition for sending the base station configuration update message includes that: the first base station and the second base station are adjacent base stations or an X2 connection has been established between the first base station and the X2 gateway. Certainly, in actual implementation, the X2 gateway also can send a base station configuration update message to all other base stations that have established an X2 connection with the current X2 gateway, wherein the base station configuration update message carries the X2 interface application layer configuration information of the second base station.

The first base station and the second base station respectively complete storage of the X2 interface application layer configuration information of the opposite end, and respectively reply with a base station configuration update acknowledgement message to the X2 gateway after storing the X2 interface application layer configuration information.

Or, the second base station sends an X2 establishment request message to the X2 gateway to initiate an X2 connection establishment process. The step includes:

the second base station sending the X2 establishment request message to the X2 gateway, wherein the X2 establishment request message carries: base station identity information of the first base station, base station identity information of the second base station, information of a serving cell under the second base station, information of a neighboring cell of the serving cell and information of a connected MME pool; and after receiving the X2 establishment request message sent from the second base station, the X2 gateway sending the X2 establishment request message to the first base station according to the base station identity information of the first base station carried in the X2 establishment request message.

Or, after receiving the X2 establishment request message sent from the second base station, according to the base station identity information of the first base station and/or the base station identity information of the second base station carried in the X2 establishment request message, the X2 gateway sends a base station configuration update message to the first base station and/or sends a base station configuration update message to the second base station correspondingly; wherein, the base station configuration update message sent to the first base station carries X2 interface application layer configuration information of the second base station, including: information of a serving cell under the second base station, information of a neighboring cell of the serving cell and information of a connected MME pool; and the base station configuration update message sent to the second base station carries X2 interface application layer configuration information of the first base station, including: information of a serving cell under the first base station, information of a neighboring cell of the serving cell and information of a connected MME pool.

The first base station and the second base station respectively complete storage of the X2 interface application layer configuration information of the opposite end, and respectively reply with a base station configuration update acknowledgement message to the X2 gateway after storing the X2 interface application layer configuration information.

Descriptions will be made with a plurality of application examples below.

Application Example 1

Figure 3:
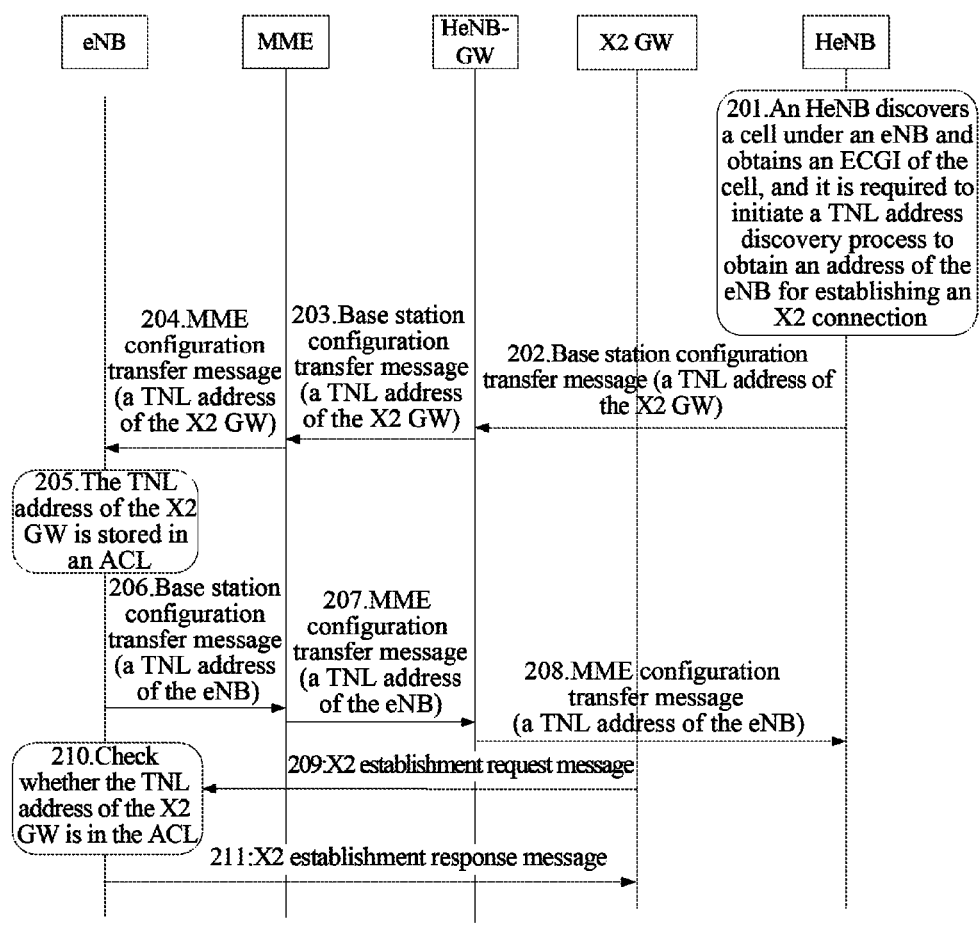
FIG. 3 is a flow diagram of the application example 1 of the present document.

The application example is to describe a flow that, in a TNL address discovery process, an initiating source-side home base station sends a TNL address of an X2 GW connected to the source-side home base station to a target-side base station, and the target-side base station stores the address to be used for an ACL. As shown in FIG. 3, the flow includes the following steps.

In step 201, after measuring a stronger signal of a neighboring cell, a UE in a cell under an HeNB sends a measurement report to the HeNB, wherein a PCI, an ECGI, a TAC and a PLMN list, etc. can be carried. The neighboring cell is a cell under an eNB in the application example; if the neighboring cell is a cell under a neighboring HeNB, a CSG ID of the neighboring cell and a member state of the UE in the neighboring cell also can be carried in the measurement report. After obtaining an ECGI (PLMN ID+cell ID) of the neighboring cell, through information including the PCI, ECGI or CSG ID and so on, the HeNB judges that the neighboring cell is a macro cell, and takes the first 20 bits of a cell ID of the macro cell as its eNB ID; and if it judges that the neighboring cell is a home base station cell, the HeNB takes all the 28 bits of a cell ID of the home base station cell as its eNB ID. After obtaining an eNB ID of a base station to which the neighboring cell belongs and a TAI (PLMN+TAC) of the neighboring cell, the HeNB is required to initiate a TNL address discovery process to obtain a transport layer address of the base station to which the neighboring cell belongs for establishing an X2 connection.

In step 202, the HeNB sends an eNB Configuration Transfer message to an MME through an S1 interface.

In the application example, the HeNB establishes an S1 connection with the MME through an HeNB GW as an S1 agent, thus it is required to firstly send the eNB Configuration Transfer message to the HeNB GW. Alternatively, the HeNB judges an X2 connection type (a direct connection or an indirect connection based on the X2 GW) required to be established with a base station to which a newly discovered neighboring cell belongs. For example, the HeNB can judge the X2 connection type according to configuration information of a network management system. In the embodiment, the HeNB judges that it is required to establish an indirect connection based on the X2 GW with an eNB. The eNB Configuration Transfer message contains a TNL address of the X2 GW connected to the HeNB, an eNB ID of a source base station and an eNB ID of a target base station (base station IDs), a TAI of a source cell and a TAI of a target cell, and an indication that a request type is a TNL address; wherein, the source cell is the cell under the HeNB in which the UE is located, and the target cell is the neighboring cell of which stronger information is measured and reported by the UE. Wherein, the indication is used for indicating the eNB to reply with a transport layer address of the eNB for establishing an X2 connection to the current HeNB. If the HeNB is not connected with the HeNB GW, the message is directly sent to the MME without going through the HeNB GW.

In step 203, after receiving the eNB Configuration Transfer message, the HeNB GW sends the eNB Configuration Transfer message to the MME.

In step 204, after receiving the eNB Configuration Transfer message, the MME sends an MME Configuration Transfer message to the eNB. Wherein, the MME can determine a target base station to which the MME sends the MME Configuration Transfer message according to the eNB ID of the target base station and the TAI of the target cell carried in the eNB Configuration Transfer message. The MME Configuration Transfer message carries the TNL address of the X2 GW connected to the HeNB, the eNB ID of the source base station and the eNB ID of the target base station, the TAI of the source cell and the TAI of the target cell, and the indication that the request type is the TNL address.

In step 205, if the eNB has a firewall function, after receiving the MME Configuration Transfer message, the eNB stores the TNL address of the X2 GW carried in the MME Configuration Transfer message into an ACL maintained by the current base station, to be used for subsequent ACL checking.

In step 206, after receiving the MME Configuration Transfer message, the eNB replies with an eNB Configuration Transfer message to the MME, wherein the eNB Configuration Transfer message carries a transport layer address of the current eNB for establishing an X2 connection, the eNB ID of the source base station and the eNB ID of the target base station, and the TAI of the source cell and the TAI of the target cell.

In step 207, after receiving the eNB Configuration Transfer message, the MME sends an MME Configuration Transfer message to the HeNB according to the eNB ID of the target base station and the TAI of the target cell carried in the eNB Configuration Transfer message, the message contains the transport layer address of the eNB for establishing the X2 connection. Since the HeNB establishes the S1 connection with the MME through the HeNB GW as the S1 agent in the application example, the MME Configuration Transfer message is firstly sent to the HeNB GW.

In step 208, after receiving the MME Configuration Transfer message, the HeNB GW sends the message to the HeNB, the message contains the transport layer address of the eNB for establishing the X2 connection.

In step 209, in the application example, the X2 GW initiates an X2 connection establishment process with the eNB, and sends an X2 establishment request message to the eNB.

In step 210, the eNB checks whether a TNL address of the source end that sends the received X2 establishment request message is contained in the ACL maintained by the current device. If the TNL address is contained, the message can be sent to the eNB smoothly; and if the TNL address is not contained, the message will be shielded and cannot be sent to the eNB smoothly. Since the TNL address of the X2 GW has been stored in the ACL in the application example, the eNB successfully receives the X2 establishment request message sent by the X2 GW.

In step 211, the eNB sends an X2 establishment response message to the X2 GW.

After an X2 connection establishment between the X2 GW and the eNB is completed, the X2 GW can send a base station configuration update message to the eNB and send a base station configuration update message to the HeNB respectively, so as to send information of the HeNB to the eNB, and send information of the eNB to the HeNB.

Application Example 2

Figure 4:
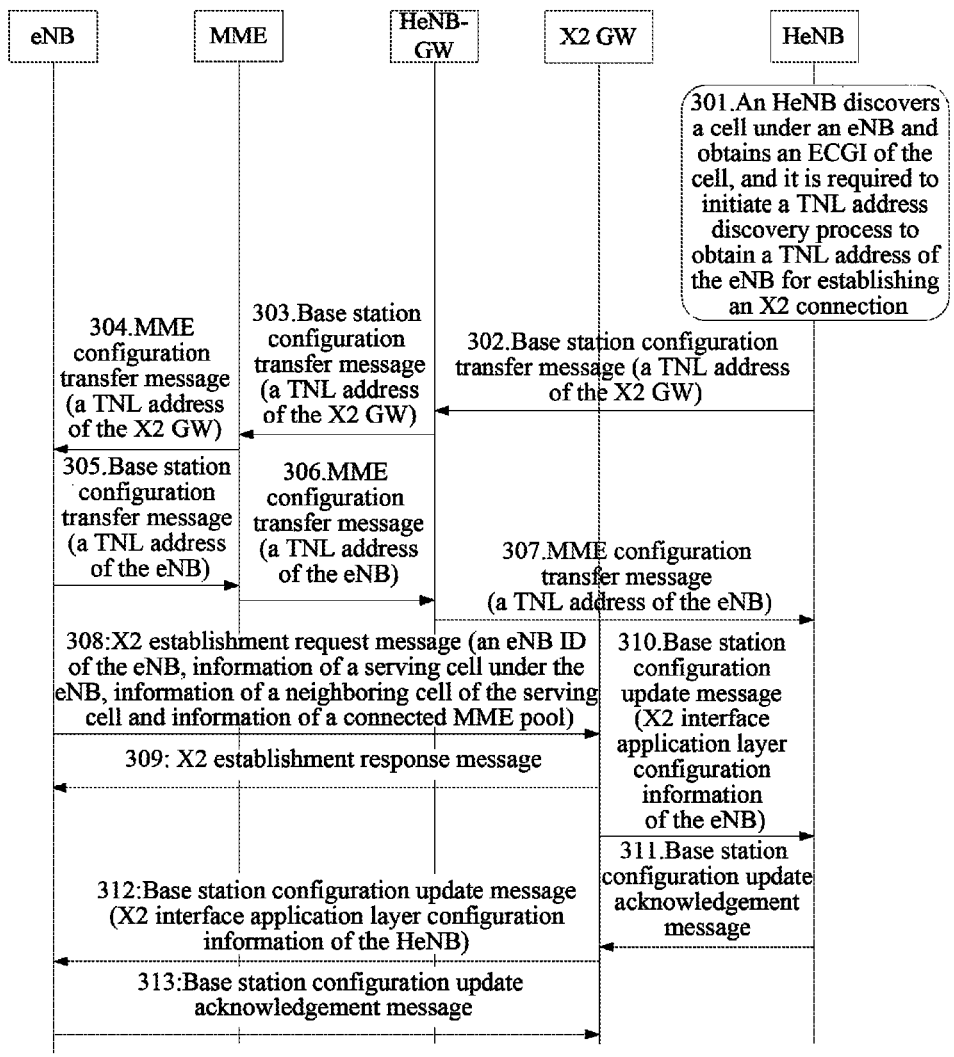
FIG. 4 is a flow diagram of the application example 2 of the present document.

The application example is to describe a flow that, in a TNL address discovery process, an initiating source-side home base station sends a TNL address of an X2 GW connected to the source-side home base station to a target-side base station, and the target-side base station establishes an indirect X2 interface with the source-side home base station through the X2 GW. As shown in FIG. 4, the flow includes the following steps.

In step 301, after measuring a stronger signal of a neighboring cell, a UE in a cell under an HeNB sends a measurement report to the HeNB, wherein a PCI, an ECGI, a TAC and a PLMN list, etc. can be carried. The neighboring cell is a cell under an eNB in the application example; if the neighboring cell is a cell under a neighboring HeNB, a CSG ID of the neighboring cell and a member state of the UE in the neighboring cell also can be carried in the measurement report. After obtaining an ECGI (PLMN ID+cell ID) of the neighboring cell, through information including the PCI, ECGI or CSG ID and so on, the HeNB judges that the neighboring cell is a macro cell, and takes the first 20 bits of a cell ID of the macro cell as its eNB ID; and if it judges that the neighboring cell is a home base station cell, the HeNB takes all the 28 bits of a cell ID of the home base station cell as its eNB ID. After obtaining an eNB ID of a base station to which the neighboring cell belongs and a TAI (PLMN+TAC) of the neighboring cell, the HeNB is required to initiate a TNL address discovery process so as to obtain a transport layer address of the base station to which the neighboring cell belongs for establishing an X2 connection.

In step 302, the HeNB sends an eNB Configuration Transfer message to an MME through an S1 interface.

In the application example, the HeNB establishes an S1 connection with the MME through an HeNB GW as an S1 agent, thus it is required to firstly send the eNB Configuration Transfer message to the HeNB GW. Alternatively, the HeNB judges an X2 connection type (a direct connection or an indirect connection based on the X2 GW) required to be established with a base station to which a newly discovered neighboring cell belongs. For example, the HeNB can judge the X2 connection type according to configuration information of a network management system. In the embodiment, the HeNB judges that it is required to establish an indirect connection based on the X2 GW with an eNB. The eNB Configuration Transfer message contains a TNL address of the X2 GW connected to the HeNB, an eNB ID of a source base station and an eNB ID of a target base station (base station IDs), a TAI of a source cell and a TAI of a target cell, and an indication that a request type is a TNL address; wherein, the source cell is the cell under the HeNB in which the UE is located, and the target cell is the neighboring cell of which stronger information is measured and reported by the UE. Wherein, the indication is used for indicating the eNB to reply with a transport layer address of the eNB for establishing an X2 connection to the current HeNB. If the HeNB is not connected with the HeNB GW, the message is directly sent to the MME without going through the HeNB GW. Alternatively, the message also contains connection establishment indication information, which is used for indicating whether the target base station eNB is required to initiate an X2 connection establishment process with the HeNB.

In step 303, after receiving the eNB Configuration Transfer message, the HeNB GW sends the eNB Configuration Transfer message to the MME.

In step 304, after receiving the eNB Configuration Transfer message, the MME sends an MME Configuration Transfer message to the eNB. Wherein, the MME can determine a target base station to which the MME sends the MME Configuration Transfer message according to the eNB ID of the target base station and the TAI of the target cell carried in the eNB Configuration Transfer message. The MME Configuration Transfer message at least carries the TNL address of the X2 GW connected to the HeNB, the eNB ID of the source base station and the eNB ID of the target base station, the TAI of the source cell and the TAI of the target cell, and the indication that the request type is the TNL address. Alternatively, the message also contains the connection establishment indication information.

Step 305~step 307 are similar to step 206~step 208 in the application example 1, which will not be repeated here.

In step 308, if the eNB has established an X2 connection with the X2 GW, it sends an X2 establishment request message to the X2 GW; and if the eNB has not established an SCTP connection and an X2 connection with the X2 GW yet, it firstly establishes the SCTP connection with the X2 GW, and then sends an X2 establishment request message to the X2 GW; wherein, the X2 establishment request message contains: an eNB ID of the eNB, information of a serving cell under the eNB, information of a neighboring cell of the serving cell and information of a connected MME pool; or, the eNB determines whether to initiate an X2 establishment process according to the connection establishment indication information, that is, whether to send the X2 establishment request message to the X2 GW, if it determines to initiate the X2 establishment process according to the above connection establishment indication information, after sending the X2 establishment request message to the X2 GW, the next step is executed; and if the X2 establishment process is not initiated, the flow ends.

In step 309, the X2 GW replies with an X2 establishment response message to the eNB, the message contains an eNB ID of the X2 GW.

In step 310, the X2 GW judges that a condition for sending a base station configuration update message is satisfied (for example, according to preconfigured information (such as a preconfigured neighbor relation and topological structure and so on), it determines that the HeNB and the eNB are adjacent base stations, or judges that an X2 connection has been established between the X2 GW and the HeNB), thus it is required to send a base station configuration update message to the HeNB, so as to send X2 interface application layer configuration information of the eNB to the HeNB. The base station configuration update message contains the X2 interface application layer configuration information of the eNB, including: information of a serving cell under the eNB, information of a neighboring cell of the serving cell and information of a connected MME pool.

In step 311, after completing storage of the X2 interface application layer configuration information of the eNB, the HeNB replies with a base station configuration update acknowledgement message to the X2 GW.

In step 312, the X2 GW judges that a condition for sending a base station configuration update message is satisfied (for example, according to preconfigured information (such as a preconfigured neighbor relation and topological structure and so on), it determines that the HeNB and the eNB are adjacent base stations, or judges that an X2 connection has been established between the X2 GW and the HeNB), thus it is required to send a base station configuration update message to the eNB, so as to add X2 interface application layer configuration information of the HeNB to the eNB, the base station configuration update message contains the X2 interface application layer configuration information of the HeNB (including: information of a serving cell under the HeNB, information of a neighboring cell of the serving cell and information of a connected MME pool). It should be noted that step 312 can be executed before or after the step 310.

In step 313, after completing storage of the X2 interface application layer configuration information of the HeNB, the eNB replies with a base station configuration update acknowledgement message to the X2 GW.

Application Example 3

Figure 5:
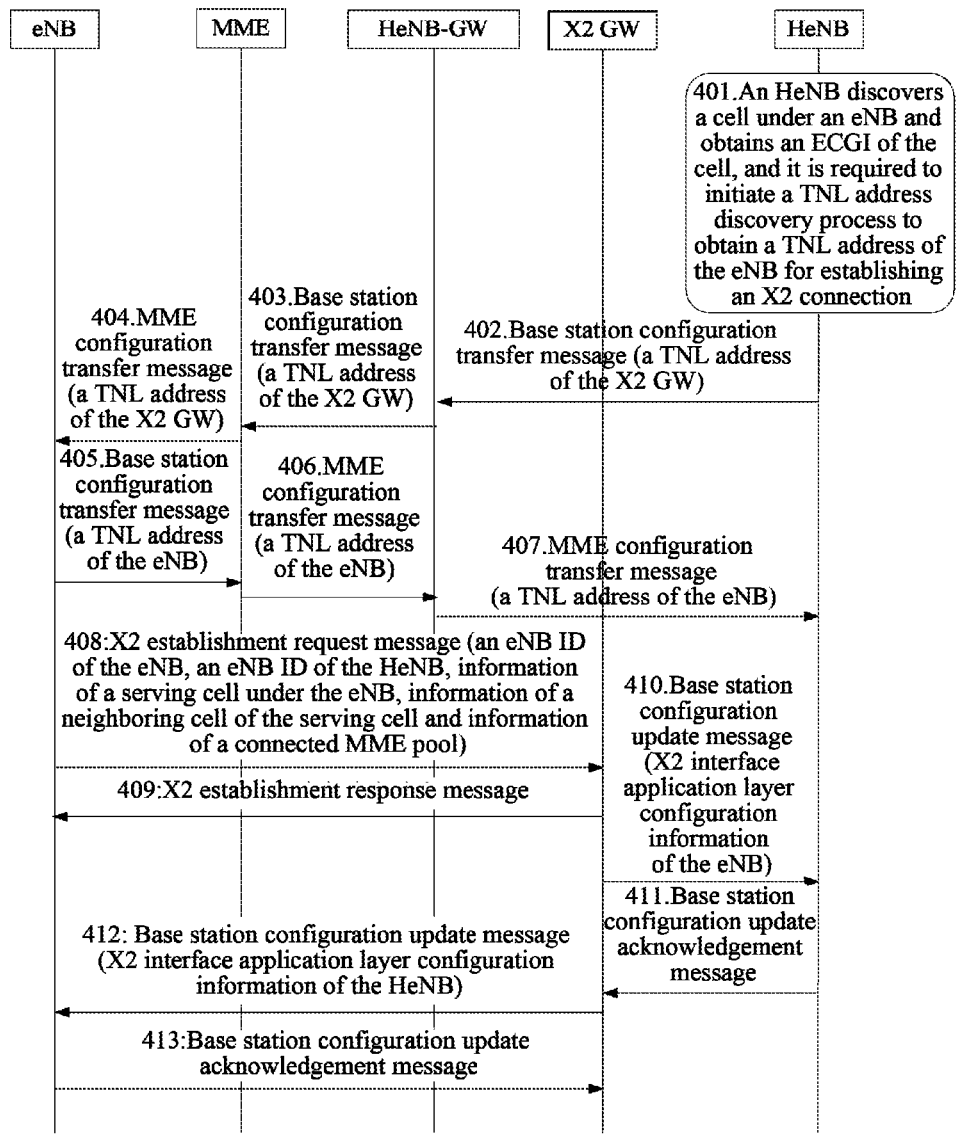
FIG. 5 is a flow diagram of the application example 3 of the present document.

The application example is to describe a flow that, in a TNL address discovery process, an initiating source-side home base station sends a TNL address of an X2 GW connected to the source-side home base station to a target-side base station, and the target-side base station establishes an indirect X2 interface with the source-side home base station through the X2 GW. As shown in FIG. 5, the flow includes the following steps.

Step 401~step 404 are similar to step 301~step 304 in the application example 2, step 405~step 407 are similar to step 206~step 208 in the application example 1, which will not be repeated here.

In step 408, if the eNB has established an X2 connection with the X2 GW, it sends an X2 establishment request message to the X2 GW; and if the eNB has not established an X2 connection with the X2 GW yet, it firstly establishes an SCTP connection with the X2 GW, and then sends an X2 establishment request message to the X2 GW; wherein, the X2 establishment request message includes: an eNB ID of the eNB, an eNB ID of the HeNB, information of a serving cell under the eNB, information of a neighboring cell of the serving cell and information of a connected MME pool; or, the eNB determines whether to initiate an X2 establishment process according to the connection establishment indication information, that is, whether to send the X2 establishment request message to the X2 GW, if it determines to initiate the X2 establishment process according to the above connection establishment indication information, after sending the X2 establishment request message to the X2 GW, the next step is executed; and if the X2 establishment process is not initiated, the flow ends.

In step 409, the X2 GW replies with an X2 establishment response message to the eNB, the message contains an eNB ID of the X2 GW.

In step 410, according to the eNB ID of the target-end eNB and the eNB ID of the source-end HeNB carried in the X2 establishment request message received in the step 409, the X2 GW determines that the HeNB and the eNB are adjacent base stations, and it is required to send a base station configuration update message to the HeNB, so as to send X2 interface application layer configuration information of the eNB to the HeNB, the base station configuration update message contains the X2 interface application layer configuration information of the eNB, including: information of a serving cell under the eNB, information of a neighboring cell of the serving cell and information of a connected MME pool.

In step 411, after completing storage of the X2 interface application layer configuration information of the eNB, the HeNB replies with a base station configuration update acknowledgement message to the X2 GW.

In step 412, according to the eNB ID of the target-end eNB and the eNB ID of the source-end HeNB carried in the X2 establishment request message received in the step 409, the X2 GW determines that the HeNB and the eNB are adjacent base stations, and it is required to send a base station configuration update message to the eNB, so as to send X2 interface application layer configuration information of the HeNB to the eNB. The message contains the X2 interface application layer configuration information of the HeNB, including: information of a serving cell under the HeNB, information of a neighboring cell of the serving cell and information of a connected MME pool. It should be noted that step 412 can be executed before or after the step 410.

In step 413, after completing storage of the X2 interface application layer configuration information of the HeNB, the eNB replies with a base station configuration update acknowledgement message to the X2 GW.

Application Example 4

Figure 6:
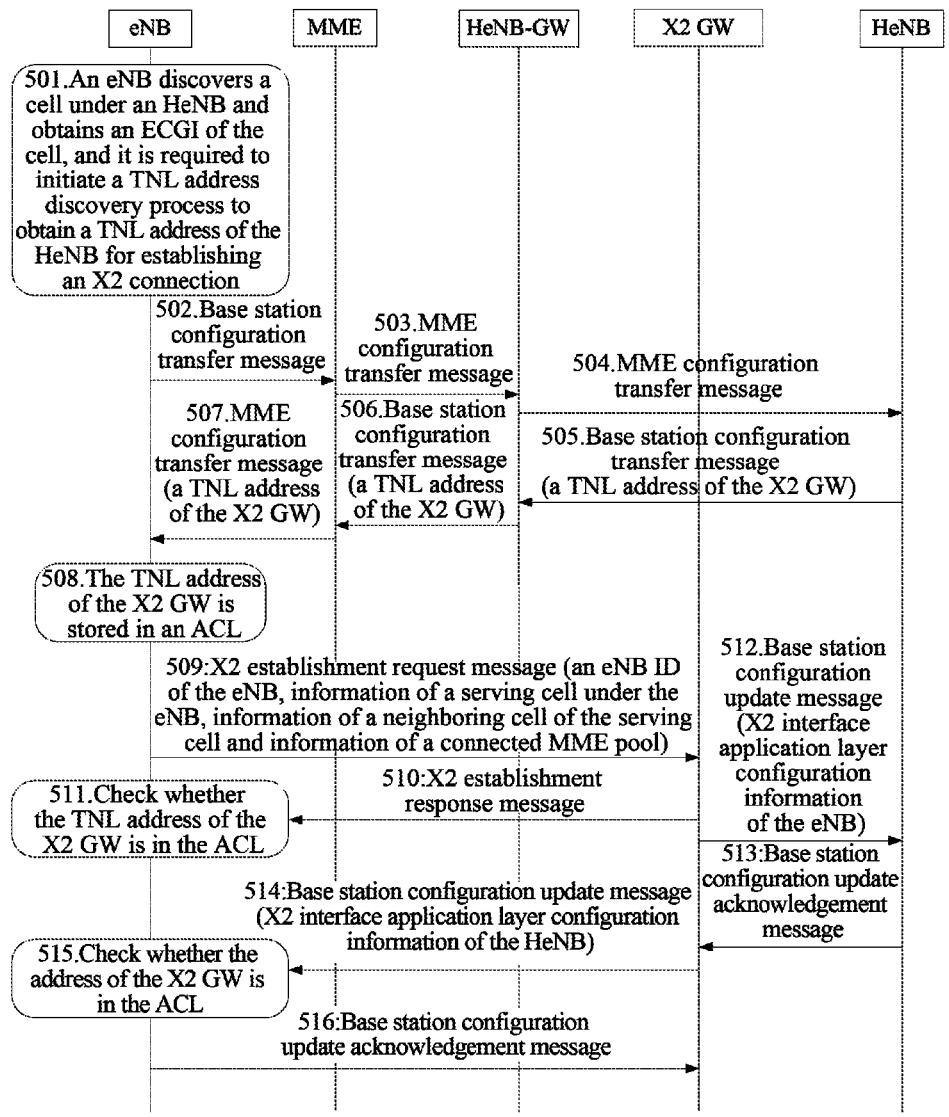
FIG. 6 is a flow diagram of the application example 4 of the present document.

The application example is to describe a flow that, in a TNL address discovery process, a target-side home base station sends a TNL address of an X2 GW connected to the target-side home base station to a source-side base station, and the source-side base station stores the address to be used for an ACL, and establishes an indirect X2 interface with the target-side home base station through the X2 GW. As shown in FIG. 6, the flow includes the following steps.

In step 501, after measuring a stronger signal of a neighboring cell, a UE in a cell under an eNB sends a measurement report to the eNB, wherein a PCI, an ECGI, a TAC and a PLMN list, etc. can be carried. The neighboring cell is a cell under an HeNB in the application example, thus a CSG ID of the neighboring cell and a member state of the UE in the cell are also carried in the measurement report. After obtaining an ECGI (PLMN ID+cell ID) of the neighboring cell, the eNB judges that the neighboring cell is a home base station cell through information including the PCI, ECGI or CSG ID and so on, and takes all the 28 bits of a cell ID of the home base station cell as its eNB ID. After obtaining an eNB ID of the neighboring base station and a TAI (PLMN+TAC) of the neighboring cell, the eNB is required to initiate a TNL address discovery process to obtain a transport layer address of the neighboring base station for establishing an X2 connection.

In step 502, the eNB sends an eNB Configuration Transfer message to an MME through an S1 interface, the message contains an eNB ID of a source base station and an eNB ID of a target base station, a TAI of a source cell and a TAI of a target cell, and an indication that a request type is a TNL address.

In step 503, after receiving the eNB Configuration Transfer message, the MME sends an MME Configuration Transfer message to the HeNB. Wherein, the MME can determine a target base station to which the MME sends the MME Configuration Transfer message according to the eNB ID of the target base station and the TAI of the target cell carried in the eNB Configuration Transfer message. The message carries the eNB ID of the source base station and the eNB ID of the target base station, the TAI of the source cell and the TAI of the target cell, and the indication that the request type is the TNL address. In the application example, the target-side base station HeNB establishes an S1 connection with the MME through an HeNB GW as an S1 agent, thus the MME Configuration Transfer message is firstly sent to the HeNB GW.

In step 504, after receiving the MME Configuration Transfer message, the HeNB GW sends the MME Configuration Transfer message to the HeNB.

In step 505, after receiving the MME Configuration Transfer message, the HeNB replies with an eNB Configuration Transfer message to the MME. Alternatively, the HeNB judges an X2 connection type (a direct connection or an indirect connection based on the X2 GW) required to be established with the eNB. For example, the HeNB can judge the X2 connection type according to configuration information of a network management system. In the embodiment, the HeNB judges that it is required to establish an indirect connection based on the X2 GW with the eNB. The eNB Configuration Transfer message at least contains a transport layer address of the X2 GW connected to the HeNB for establishing an X2 connection. If the HeNB judges that it is required to establish a direct connection with the eNB, the eNB Configuration Transfer message at least contains a transport layer address of the HeNB for establishing an X2 connection. In the application example, the target-side base station HeNB establishes the S1 connection with the MME through the HeNB GW as the S1 agent, thus the eNB Configuration Transfer message is firstly sent to the HeNB GW.

In step 506, after receiving the eNB Configuration Transfer message, the HeNB GW sends the message to the MME.

In step 507, after receiving the eNB Configuration Transfer message, the MME sends an MME Configuration Transfer message to the eNB according to the eNB ID of the target base station and the TAI of the target cell carried in the eNB Configuration Transfer message, wherein the MME Configuration Transfer message carries the transport layer address of the X2 GW for establishing the X2 connection.

In step 508, if the eNB has a firewall function, after receiving the MME Configuration Transfer message, the eNB stores the address of the X2 GW carried in the MME Configuration Transfer message into an ACL maintained by the current base station, to be used for subsequent ACL checking.

In step 509, the eNB initiates an X2 connection establishment according to the received TNL address of the X2 GW, and sends an X2 establishment request message to the X2 GW, wherein the X2 establishment request message carries: an eNB ID of the eNB, information of a serving cell under the eNB, information of a neighboring cell of the serving cell and information of a connected MME pool.

In step 510, the X2 GW replies with an X2 establishment response message to the eNB, the message carries an eNB ID of the X2 GW.

In step 511, the eNB executes ACL checking, and judges whether the TNL address of the sending end carried in the received X2 establishment response message is in the ACL. In the application example, the eNB has stored the address of the X2 GW in the ACL in the step 508, thus the ACL checking is successful, and the eNB successfully receives the X2 establishment response message sent by the X2 GW.

In step 512, the X2 GW judges that a condition for sending a base station configuration update message is satisfied (for example, according to preconfigured information (such as a preconfigured neighbor relation and topological structure and so on), it determines that the HeNB and the eNB are adjacent base stations, or judges that an X2 connection has been established between the X2 GW and the HeNB), thus it is required to send a base station configuration update message to the HeNB, so as to send X2 interface application layer configuration information of the eNB to the HeNB. The message contains the X2 interface application layer configuration information of the eNB, including: information of a serving cell under the eNB, information of a neighboring cell of the serving cell and information of a connected MME pool.

In step 513, after completing storage of the X2 interface application layer configuration information of the eNB, the HeNB replies with a base station configuration update acknowledgement message to the X2 GW.

In step 514, the X2 GW judges that a condition for sending a base station configuration update message is satisfied (for example, according to preconfigured information (such as a preconfigured neighbor relation and topological structure and so on), it determines that the HeNB and the eNB are adjacent base stations, or judges that an X2 connection has been established between the X2 GW and the HeNB), thus it is required to send a base station configuration update message to the eNB, so as to add X2 interface application layer configuration information of the HeNB to the eNB, the message contains the X2 interface application layer configuration information of the HeNB, including: information of a serving cell under the HeNB, information of a neighboring cell of the serving cell and information of a connected MME pool. It should be noted that step 514 can be executed before or after the step 512.

In step 515, the eNB executes ACL checking, and judges whether the TNL address of the sending end in the received X2 interface base station configuration update message is in the ACL. In the application example, the eNB has stored the address of the X2 GW in the ACL in the step 508, thus the ACL checking is successful, and the eNB successfully receives the base station configuration update message sent by the X2 GW.

In step 516, after completing storage of the X2 interface application layer configuration information of the HeNB, the eNB replies with a base station configuration update acknowledgement message to the X2 GW.

Application Example 5

Figure 7:
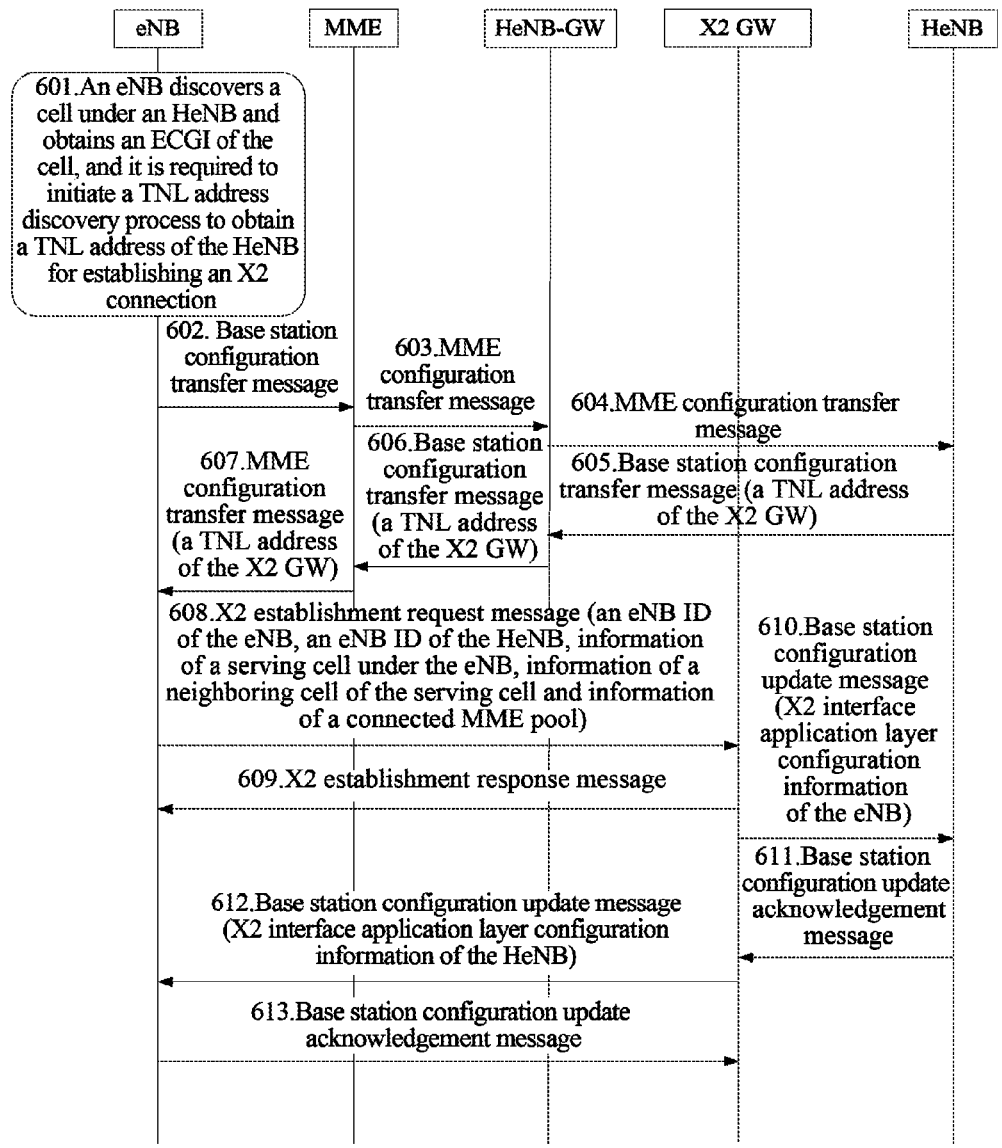
FIG. 7 is a flow diagram of the application example 5 of the present document.

The application example is to describe a flow that, in a TNL address discovery process, a target-side home base station sends a TNL address of an X2 GW connected to the target-side home base station to a source-side base station, and the source-side base station establishes an indirect X2 interface with the target-side home base station through the X2 GW. As shown in FIG. 7, the flow includes the following steps.

Step 601~step 607 are similar to step 501~step 507 in the application example 4, which will not be repeated here.

In step 608, if the eNB has established an X2 connection with the X2 GW, it sends an X2 establishment request message to the X2 GW; and if the eNB has not established an X2 connection with the X2 GW yet, it firstly establishes an SCTP connection with the X2 GW, and then sends an X2 establishment request message to the X2 GW; the X2 establishment request message includes: an eNB ID of the HeNB, an eNB ID of the eNB, information of a serving cell under the eNB, information of a neighboring cell of the serving cell and information of a connected MME pool.

In step 609, the X2 GW replies with an X2 establishment response message to the eNB, the message contains an eNB ID of the X2 GW.

In step 610, according to the eNB ID of the source-end HeNB and the eNB ID of the target-end eNB carried in the X2 establishment request message received in the step 609, the X2 GW determines that the HeNB and the eNB are adjacent base stations, and it is required to send a base station configuration update message to the HeNB, so as to send X2 interface application layer configuration information of the eNB to the HeNB, the message contains the X2 interface application layer configuration information of the eNB, including: information of a serving cell under the eNB, information of a neighboring cell of the serving cell and information of a connected MME pool.

In step 611, after completing storage of the X2 interface application layer configuration information of the eNB, the HeNB replies with a base station configuration update acknowledgement message to the X2 GW.

In step 612, according to the eNB ID of the source-end HeNB and the eNB ID of the target-end eNB carried in the X2 establishment request message received in the step 609, the X2 GW determines that the HeNB and the eNB are adjacent base stations, and it is required to send a base station configuration update message to the eNB, so as to send X2 interface application layer configuration information of the HeNB to the eNB. The message contains the X2 interface application layer configuration information of the HeNB, including: information of a serving cell under the HeNB, information of a neighboring cell of the serving cell and information of a connected MME pool. It should be noted that step 612 can be executed before or after the step 610.

In step 613, after completing storage of the X2 interface application layer configuration information of the HeNB, the eNB replies with a base station configuration update acknowledgement message to the X2 GW.

Application Example 6

Figure 8:
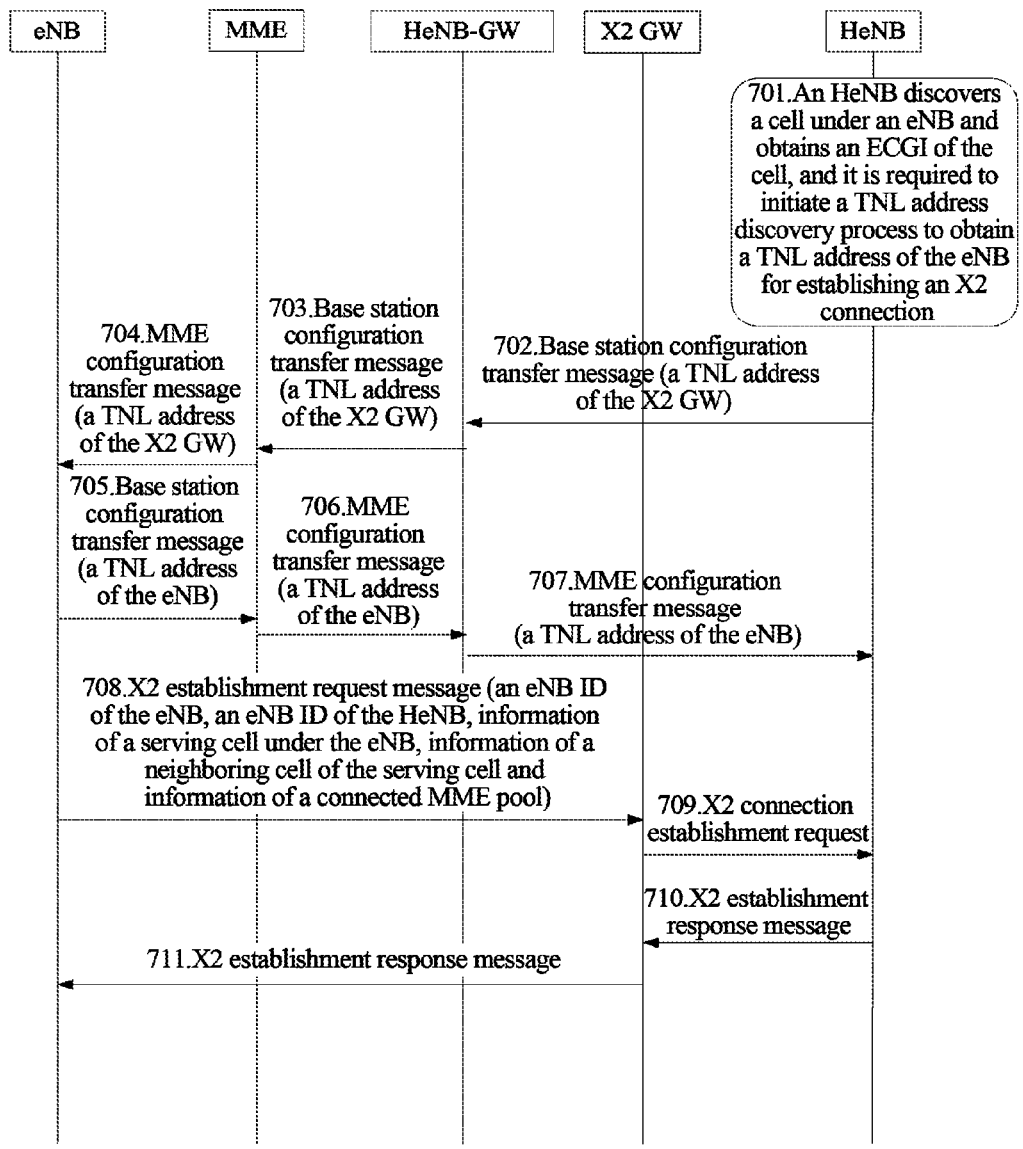
FIG. 8 is a flow diagram of the application example 6 of the present document.

The application example is to describe a flow that, in a TNL address discovery process, an initiating source-side home base station sends a TNL address of an X2 GW connected to the source-side home base station to a target-side base station, and the target-side base station establishes an indirect X2 interface with the source-side home base station through the X2 GW. As shown in FIG. 8, the flow includes the following steps.

Step 701~step 708 are similar to step 401~step 408 in the application example 3, which will not be repeated here.

In step 709, according to identity information of a target base station (an eNB ID of an HeNB) carried in the received X2 establishment request message, the X2 GW sends the X2 establishment request message to the HeNB.

In step 710, the HeNB replies with an X2 establishment response message to the X2 GW, the X2 establishment response message contains identity information of a target base station (an eNB ID of an eNB).

In step 711, the X2 GW sends an X2 establishment response message to the eNB according to the eNB ID of the eNB. Therefore, an X2 establishment process is completed through the X2 GW between the eNB and the HeNB.

Application Example 7

Figure 9:
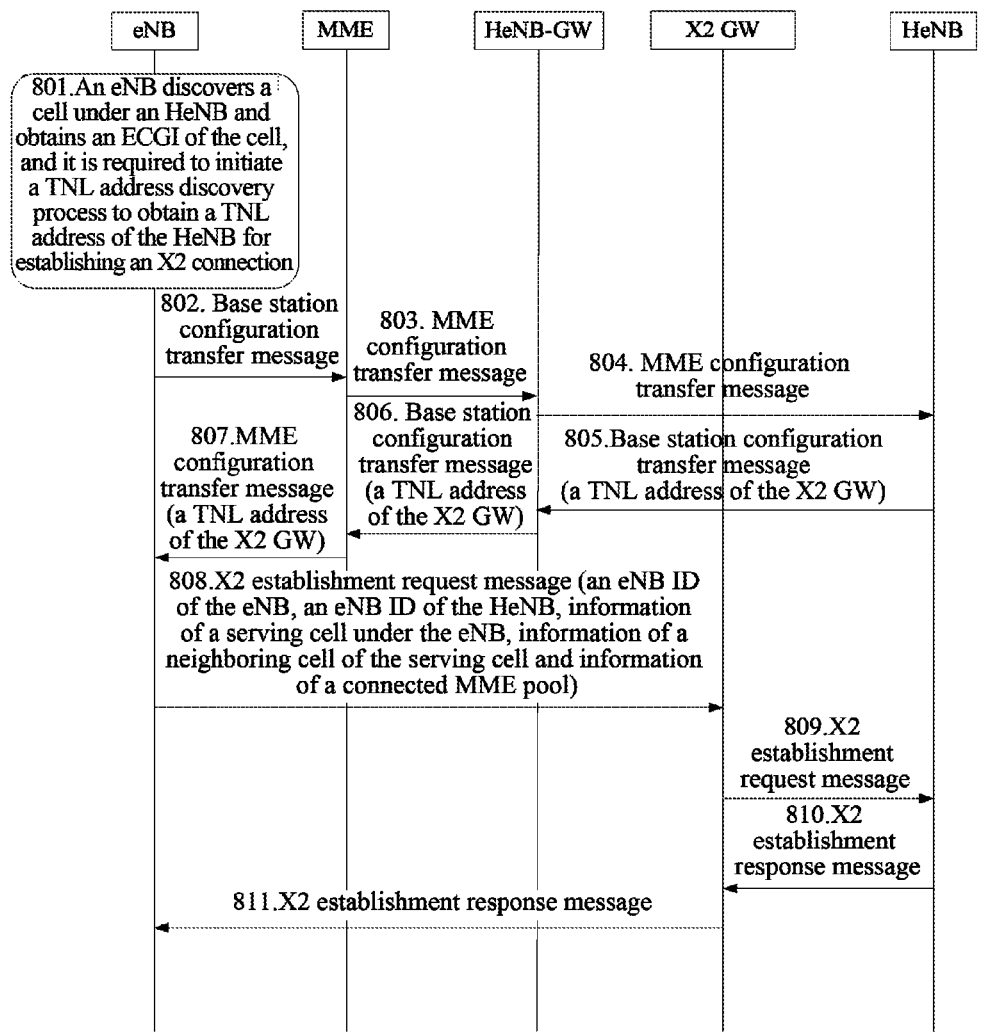
FIG. 9 is a flow diagram of the application example 7 of the present document.

The application example is to describe a flow that, in a TNL address discovery process, a target-side home base station sends a TNL address of an X2 GW connected to the target-side home base station to a source-side base station, and the source-side base station establishes an indirect X2 interface with the target-side home base station through the X2 GW. As shown in FIG. 9, the flow includes the following steps.

Step 801~step 808 are similar to step 601~step 608 in the application example 5, which will not be repeated here.

In step 809, according to identity information of a target base station (an eNB ID of an HeNB) carried in the received X2 establishment request message, the X2 GW sends the X2 establishment request message to the HeNB.

In step 810, the HeNB replies with an X2 establishment response message to the X2 GW, the X2 establishment response message contains identity information of a target base station (an eNB ID of an eNB).

In step 811, the X2 GW sends an X2 establishment response message to the eNB according to the eNB ID of the eNB. Therefore, an X2 establishment process is completed through the X2 GW between the eNB and the HeNB.

In addition, in the embodiment, a system for notifying a transport layer address includes:

a first base station, configured to send transport layer address information of an X2 gateway connected to the first base station to a second base station; wherein, the first base station is a home base station; and the second base station, configured to initiate an X2 connection establishment flow according to the received transport layer address information of the X2 gateway.

Preferably, the system also includes: a mobility management entity (MME);

the first base station is configured to send the transport layer address information of the X2 gateway connected to the first base station to the second base station by means of:

initiating a transport layer address discovery process, and sending a base station configuration transfer message to the MME, wherein the base station configuration transfer message at least carries the transport layer address information of the X2 gateway connected to the first base station;

the MME is configured to send an MME configuration transfer message to the second base station, wherein the MME configuration transfer message at least carries the transport layer address information of the X2 gateway connected to the first base station.

Preferably, the system also includes: a mobility management entity (MME);

the second base station is further configured to: initiate a transport layer address discovery process, and send a base station configuration transfer message to the MME;

the MME is configured to: after receiving the base station configuration transfer message, send an MME configuration transfer message to the first base station; and it is also used to: after receiving the base station configuration transfer message sent from the first base station, send an MME configuration transfer message to the second base station, wherein the MME configuration transfer message at least carries the transport layer address information of the X2 gateway connected to the first base station;

the first base station is configured to send the transport layer address information of the X2 gateway connected to the first base station to the second base station by means of:

sending a base station configuration transfer message to the MME, wherein the base station configuration transfer message at least carries the transport layer address information of the X2 gateway connected to the first base station.

Preferably, the system also includes: a home gateway;

the home base station gateway is configured to: when the first base station establishes an S1 connection with the MME through the home base station gateway as an S1 agent, transmit the base station configuration transfer message and the MME configuration transfer message transmitted between the first base station and the MME.

Preferably, the second base station is further configured to: after receiving the transport layer address information of the X2 gateway, if a firewall function exists, store the transport layer address information of the X2 gateway in an access control list (ACL) maintained by the current base station; and in a subsequent communication process between the second base station and the X2 gateway, check whether a transport layer address of the X2 gateway communicating with the second base station exists in the ACL; if the transport layer address exists, permit communication between the X2 gateway and the current base station; and if the transport layer address does not exist, reject communication between the X2 gateway and the current base station.

Preferably, the system also includes: an X2 gateway;

the second base station is configured to initiate the X2 connection establishment flow according to the received transport layer address information of the X2 gateway by means of:

sending an X2 establishment request message to the X2 gateway, wherein the X2 establishment request message carries: base station identity information of the second base station, information of a serving cell under the second base station, information of a neighboring cell of the serving cell and information of a connected MME pool;

the X2 gateway is configured to: after completing an X2 connection establishment with the second base station, if judging that a condition for sending a base station configuration update message is satisfied, send a base station configuration update message to the first base station and send a base station configuration update message to the second base station respectively; wherein, the base station configuration update message sent to the first base station carries X2 interface application layer configuration information of the second base station, comprising: information of a serving cell under the second base station, information of a neighboring cell of the serving cell and information of a connected MME pool; and the base station configuration update message sent to the second base station carries X2 interface application layer configuration information of the first base station, comprising: information of a serving cell under the first base station, information of a neighboring cell of the serving cell and information of a connected MME pool.

Preferably, the condition for sending the base station configuration update message comprises that: the first base station and the second base station are adjacent base stations or an X2 connection has been established between the first base station and the X2 gateway.

Preferably, the system also includes: an X2 gateway;

the second base station is configured to initiate the X2 connection establishment flow according to the received transport layer address information of the X2 gateway by means of:

sending an X2 establishment request message to the X2 gateway, wherein the X2 establishment request message carries: base station identity information of the first base station, base station identity information of the second base station, information of a serving cell under the second base station, information of a neighboring cell of the serving cell and information of a connected MME pool.

Preferably, the X2 gateway is configured to: after receiving the X2 establishment request message sent from the second base station, send the X2 establishment request message to the first base station according to the base station identity information of the first base station carried in the X2 establishment request message.

Preferably, the X2 gateway is further configured to: after receiving the X2 establishment request message sent from the second base station, according to the base station identity information of the first base station and/or the base station identity information of the second base station carried in the X2 establishment request message, send a base station configuration update message to the first base station and/or send a base station configuration update message to the second base station correspondingly; wherein, the base station configuration update message sent to the first base station carries X2 interface application layer configuration information of the second base station, comprising: information of a serving cell under the second base station, information of a neighboring cell of the serving cell and information of a connected MME pool; and the base station configuration update message sent to the second base station carries X2 interface application layer configuration information of the first base station, comprising: information of a serving cell under the first base station, information of a neighboring cell of the serving cell and information of a connected MME pool.

Preferably, the first base station is further configured to store the received X2 interface application layer configuration information of the second base station; and the second base station is further configured to store the received X2 interface application layer configuration information of the first base station.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above embodiments also can be implemented by using one or multiple integrated circuits. Correspondingly, each module/unit in the above embodiments can be implemented in a form of hardware, and also can be implemented in a form of software function module. The present document is not limited to any combination of hardware and software in a specific form.

The above description is only the preferred embodiments of the present document, which is not used to limit the protection scope of the present document. According to the summary of the invention of the present document, there still can be other various embodiments, the skilled familiar to the art can make various corresponding changes and transformations according to the present document without departing from the spirit and essence of the present document. All the modifications, equivalent substitutions, and improvements, etc. made within the spirit and principle of the present document shall fall into the protection scope of the present document.

INDUSTRIAL APPLICABILITY

In the embodiments of the present document, in a case that an X2 GW is deployed, a TNL address of the X2 GW can be notified to a target base station, so that an indirect X2 connection establishment process between the target base station and an HeNB under the X2 GW can be executed smoothly, and a firewall function of the base station is executed smoothly when the X2 GW communicates with the target base station.

What is claimed is:

1. A method for notifying a transport layer address, comprising:
 a first base station sending to a second base station transport layer address information of an X2 gateway connected to the first base station by using a home base station gateway connected to the first base station; wherein, the first base station is a home base station; and the second base station initiating an X2 connection establishment to the X2 gateway according to the transport layer address information of the X2 gateway;
wherein the second base station initiating the X2 connection establishment to the X2 gateway according to the transport layer address information of the X2 gateway specifically comprises:
the second base station sending an X2 establishment request message to the X2 gateway, wherein the X2 establishment request message carries: base station identity information of the first base station, base station identity information of the second base station, information of a serving cell under the second base station, information of a neighboring cell of the serving cell and information of a connected MME pool.

2. The method according to claim 1, wherein:
the first base station sending the transport layer address information of the X2 gateway connected to the first base station to the second base station comprises:
the first base station initiating a transport layer address discovery process, and sending a base station configuration transfer message to a Mobility Management Entity (MME), wherein the base station configuration transfer message carries the transport layer address information of the X2 gateway connected to the first base station; and
the MME sending an MME configuration transfer message to the second base station, wherein the MME configuration transfer message carries the transport layer address information of the X2 gateway connected to the first base station.

3. The method according to claim 2, wherein:
the base station configuration transfer message sent by the first base station to the MME further carries connection establishment indication information; wherein, the connection establishment indication information is used for indicating whether the second base station is required to initiate an X2 connection establishment process;
the MME configuration transfer message sent by the MME to the second base station further carries the connection establishment indication information;
the second base station initiating the X2 connection establishment according to the transport layer address information of the X2 gateway further comprises:
in a case that the transport layer address information of the X2 gateway is received in the transport layer address discovery process initiated by the first base station, if judging that the connection establishment indication information carried in the MME configuration transfer message indicates that initiating the X2 connection establishment process is required, the second base station sending an X2 connection establishment request message to the X2 gateway.

4. The method according to claim 2, wherein:
if the first base station establishes an S1 connection with the MME through a home base station gateway as an S1 agent, the base station configuration transfer message and the MME configuration transfer message transmitted between the first base station and the MME are both transmitted through the home base station gateway.

5. The method according to claim 1, wherein:
the first base station sending the transport layer address information of the X2 gateway connected to the first base station to the second base station comprises:

the second base station initiating a transport layer address discovery process, and sending a base station configuration transfer message to an MME;
after receiving the base station configuration transfer message, the MME sending an MME configuration transfer message to the first base station;
the first base station sending a base station configuration transfer message to the MME, wherein the base station configuration transfer message carries the transport layer address information of the X2 gateway connected to the first base station; and
the MME sending an MME configuration transfer message to the second base station, wherein the MME configuration transfer message carries the transport layer address information of the X2 gateway connected to the first base station,
preferably,
wherein:
if the first base station establishes an S1 connection with the MME through a home base station gateway as an S1 agent, the base station configuration transfer message and the MME configuration transfer message transmitted between the first base station and the MME are both transmitted through the home base station gateway.

6. The method according to claim 1, further comprising:
after receiving the transport layer address information of the X2 gateway, if there is a firewall function, the second base station storing the transport layer address information of the X2 gateway in an access control list (ACL) maintained by a current base station; and
in a communication process between the second base station and the X2 gateway, the second base station checking whether a transport layer address of the X2 gateway communicating with the second base station exists in the ACL; if the transport layer address exists, permitting communication between the X2 gateway and the current base station; and if the transport layer address does not exist, rejecting communication between the X2 gateway and the current base station.

7. The method according to claim 1, wherein:
the second base station initiating the X2 connection establishment according to the received transport layer address information of the X2 gateway further comprises:
after completing an X2 connection establishment with the second base station, if judging that a condition for sending a base station configuration update message is satisfied, the X2 gateway sending a base station configuration update message to the first base station and sending a base station configuration update message to the second base station respectively; wherein, the base station configuration update message sent to the first base station carries X2 interface application layer configuration information of the second base station, comprising: information of a serving cell under the second base station, information of a neighboring cell of the serving cell and information of a connected MME pool; and the base station configuration update message sent to the second base station carries X2 interface application layer configuration information of the first base station, comprising: information of a serving cell under the first base station, information of a neighboring cell of the serving cell and information of a connected MME pool.

8. The method according to claim 7, wherein:
a condition for sending the base station configuration update message comprises that: the first base station and the second base station are adjacent base stations or an X2 connection has been established between the first base station and the X2 gateway, or, the method further comprises:

the first base station storing the X2 interface application layer configuration information of the second base station; and the second base station storing the X2 interface application layer configuration information of the first base station.

9. The method according to claim 1, further comprising:
after receiving the X2 establishment request message sent from the second base station, the X2 gateway sending the X2 establishment request message to the first base station according to the base station identity information of the first base station carried in the X2 establishment request message.

10. The method according to claim 1, further comprising:
after receiving the X2 establishment request message sent from the second base station, according to the base station identity information of the first base station or the base station identity information of the second base station carried in the X2 establishment request message, the X2 gateway sending a base station configuration update message to the first base station or sending a base station configuration update message to the second base station correspondingly; wherein, the base station configuration update message sent to the first base station carries X2 interface application layer configuration information of the second base station, comprising: information of a serving cell under the second base station, information of a neighboring cell of the serving cell and information of a connected MME pool; and the base station configuration update message sent to the second base station carries X2 interface application layer configuration information of the first base station, comprising: information of a serving cell under the first base station, information of a neighboring cell of the serving cell and information of a connected MME pool.

11. The method according to claim 1, further comprising:
the first base station storing the received X2 interface application layer configuration information of the second base station; and the second base station storing the received X2 interface application layer configuration information of the first base station.

12. A system for notifying a transport layer address, comprising an X2 gateway, a first base station and a second base station, wherein:

the first base station is configured to: send to a second base station transport layer address information of the X2 gateway connected to the first base station by using a home base station gateway connected to the first base station; wherein, the first base station is a home base station; and the second base station is configured to: initiate an X2 connection establishment to the X2 gateway according to the transport layer address information of the X2 gateway by means of:

the second base station sending an X2 establishment request message to the X2 gateway, wherein the X2 establishment request message carries: base station identity information of the first base station, base station identity information of the second base station, information of a serving cell under the second base station, information of a neighboring cell of the serving cell and information of a connected MME pool.

13. The system according to claim 12, further comprising:
a mobility management entity (MME); wherein:

the first base station is configured to send the transport layer address information of the X2 gateway connected to the first base station to the second base station by means of:

initiating a transport layer address discovery process, and sending a base station configuration transfer message to the MME, wherein the base station configuration transfer message carries the transport layer address information of the X2 gateway connected to the first base station;

the MME is configured to: send an MME configuration transfer message to the second base station, wherein the MME configuration transfer message carries the transport layer address information of the X2 gateway connected to the first base station, or, the system further comprises: a mobility management entity (MME); wherein:

the second base station is further configured to: initiate a transport layer address discovery process, and send a base station configuration transfer message to the MME;

the MME is configured to: after receiving the base station configuration transfer message, send an MME configuration transfer message to the first base station; and after receiving the base station configuration transfer message sent from the first base station, send an MME configuration transfer message to the second base station, wherein the MME configuration transfer message carries the transport layer address information of the X2 gateway connected to the first base station;

the first base station is configured to send the transport layer address information of the X2 gateway connected to the first base station to the second base station by means of:

sending a base station configuration transfer message to the MME, wherein the base station configuration transfer message at least carries the transport layer address information of the X2 gateway connected to the first base station.

14. The system according to claim 13, further comprising:
a home base station gateway, wherein:

the home base station gateway is configured to: when the first base station establishes an S1 connection with the MME through the home base station gateway as an S1 agent, transmit the base station configuration transfer message and the MME configuration transfer message transmitted between the first base station and the MME.

15. The system according to claim 12, wherein:
the second base station is further configured to: after receiving the transport layer address information of the X2 gateway, if there is a firewall function, store the transport layer address information of the X2 gateway in an access control list (ACL) maintained by a current base station; and in a communication process between the second base station and the X2 gateway, check whether a transport layer address of the X2 gateway communicating with the second base station exists in the ACL; if the transport layer address exists, permit communication between the X2 gateway and the current base station; and if the transport layer address does not exist, reject communication between the X2 gateway and the current base station.

16. The system according to claim 12, wherein the X2 gateway is configured to: after completing an X2 connection establishment with the second base station, if judging that a condition for sending a base station configuration update message is satisfied, send a base station configuration update message to the first base station and send a base station configuration update message to the second base station respectively; wherein, the base station configuration update message sent to the first base station carries X2 interface application layer configuration information of the second base station, comprising: information of a serving cell under the second base station, information of a neighboring cell of the serving cell and information of a connected MME pool; and the base station configuration update message sent to the second base station carries X2 interface application layer configuration information of the first base station, comprising: information of a serving cell under the first base station, information of a neighboring cell of the serving cell and information of a connected MME pool.

17. The system according to claim 16, wherein:
the condition for sending the base station configuration update message comprises that: the first base station and the second base station are adjacent base stations or an X2 connection has been established between the first base station and the X2 gateway, or, wherein:

the first base station is further configured to: store the X2 interface application layer configuration information of the second base station; and the second base station is further configured to: store the X2 interface application layer configuration information of the first base station.

18. The system according to claim 12, wherein:
the X2 gateway is configured to: after receiving the X2 establishment request message sent from the second base station, send the X2 establishment request message to the first base station according to the base station identity information of the first base station carried in the X2 establishment request message, or, wherein:

the X2 gateway is configured to: after receiving the X2 establishment request message sent from the second base station, according to the base station identity information of the first base station or the base station identity information of the second base station carried in the X2 establishment request message, send a base station configuration update message to the first base station or send a base station configuration update message to the second base station correspondingly; wherein, the base station configuration update message sent to the first base station carries X2 interface application layer configuration information of the second base station, comprising: information of a serving cell under the second base station, information of a neighboring cell of the serving cell and information of a connected MME pool; and the base station configuration update message sent to the second base station carries X2 interface application layer configuration information of the first base station, comprising: information of a serving cell under the first base station, information of a neighboring cell of the serving cell and information of a connected MME pool, or, wherein:

the first base station is further configured to: store the X2 interface application layer configuration information of the second base station; and the second base station is further configured to: store the X2 interface application layer configuration information of the first base station.

* * * * *